INVENTORS
JOSUE JEAN PHILIPPE VALETON
FREDERIK WILLEM DE VRIJER
KEES TEER

BY

AGENT

INVENTORS
JOSUE JEAN PHILIPPE VALETON
FREDERIK WILLEM DE VRIJER
KEES TEER 2,870,248

MULTIPLEX TRANSMISSION SYSTEM FOR THE TRANSMISSION OF THREE SIGNALS

Josue Jean Philippe Valeton, Frederik Willem de Vrijer, and Kees Teer, Eindhoven, Netherlands, assignors, by mesne assignments, to North American Philips Company, Inc., New York, N. Y., a corporation of Delaware Application December 22, 1953, Serial No. 399,762

Claims priority, application Netherlands January 2, 1953

7 Claims. (Cl. 178—5.2)

This invention relates to systems for the transmission in one frequency range of three signals each relating to a television image or a similar image scanned in lines, in which a signal of large bandwidth is transmitted continuously whereas the two other signals of smaller bandwidth, modulated on an auxiliary carrier wave, are transmitted alternately. Such systems may be used in colour television.

In such systems it suffices to utilise a bandpass filter and a detector circuit for demodulating the two signals of small bandwidth at the receiving end. In contra-distinction with several other systems, the auxiliary carrier wave need not be generated again in the receiver. However, the receiver must comprise a switching mechanism which supplies the signals provided by the detector during one period to the reproducing device associated with one signal and during the subsequent period to the reproducing device associated with the other signal.

As is well known, in the receiver the image originating from the signal of large bandwidth, signal I, will be interfered with by the two other signals, II and III, and conversely the images originating from the signals II and III will be interfered with by the signal I of large bandwidth. However, it appears that in certain cases the said interference is substantially neutralised visually by suitable choice of the frequency of the auxiliary carrier wave. If, for example, as is usually the case, the image consists of an odd number of lines and two interlaced fields invariably only one signal being modulated on the auxiliary carrier wave, and if the frequency of the auxiliary carrier wave is equal to an odd multiple of half the line frequency, it appears that interference on a given line is substantially eliminated with the subsequent scanning of this line due to the phase of the auxiliary carrier wave being shifted by radians with respect to the first scanning. Strictly speaking, such is generally the case only if stationary objects are photographed by the cameras. However, if the frame frequency is not unduly low the elimination of interference also occurs to a great approximation for moving objects.

In a known system in which two signals are alternately modulated on the auxiliary carrier wave, the transmission of the two signals of small bandwidth is alternated at raster frequency, the switching mechanism in the receiver being synchronized to the frame synchronising pulses. However, the reproducing device for one signal of small bandwidth then receives a signal only during the scanning of odd lines, the reproducing device for the other signal of small bandwidth receiving a signal only during the scanning of even lines. If the images originating from the three transmitted signals are combined optically as is the case in colour television, colour flicker is thus included at a low flickering frequency which becomes manifest as very troublesome.

The said disadvantage is mitigated by causing the transmission of the signals of small bandwidth to alternate at line frequency. If the switching mechanism switches at line frequency, then as a result of the odd number of lines, the lines reproducing the signals I and II during one frame period, reproduce the signals I and III during the subsequent frame period, the signals I and II again in the frame period thereafter, etc. Consequently, interference on a given line in the frame of signal I, which interference originates from signal II, and conversely, occurs with every two frames. By the indicated choice of the frequency of the auxiliary carrier wave, its phase has thus shifted by $2\times\pi$ radians, so that the interferences do not neutralise one another, but on the contrary amplify one another.

The system according to the invention mitigates the said disadvantage and is characterised in that the phase of the auxiliary carrier wave is shifted by an odd number times $\pi$ radians after every two frames.

In order that the invention may be readily carried into effect, it will now be described with reference to the accompanying drawing, given by way of example, in which.

Figure 1:
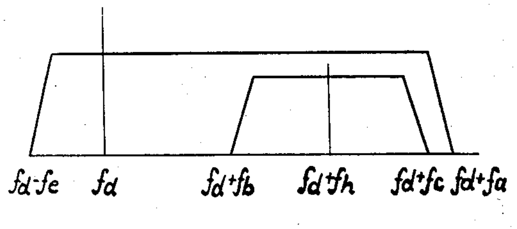
Fig. 1 shows the frequency spectrum of three television signals in the transmission path.
Figure 2:
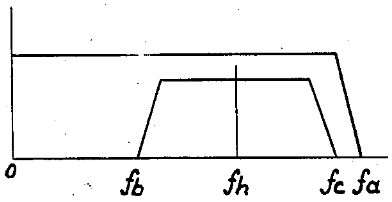
Fig. 2 shows the frequency spectrum of the three television signals at the transmitting end.

Fig. 1 shows the frequency spectrum which may be used for the system according to the invention and which extends between frequencies $f_d-f_e$ and $f_d+f_a$. Such a frequency spectrum occurs if a carrier wave $f_d$ is modulated by two signals extending through frequency bands from 0 to $f_a$ and from $f_b$ to $f_c$, as shown in Fig. 2, and if the lower side-band is partly suppressed. The signal I of large bandwidth consequently extends to the frequency $f_a$ and the second signal between the frequencies $f_b$ and $f_c$, the latter signal being obtained by modulation alternately of signal II or signal III, each of a bandwidth $f_h-f_b$, on an auxiliary carrier wave having a frequency $f_h$, it being possible for one sideband to be suppressed, if desired, wholly or in part.

Such a frequency spectrum is naturally also obtained by modulating the signal I on a carrier wave having the frequency $f_d$ and modulating alternately the signal II or III on a carrier wave having the frequency $f_d+f_h$. However, after demodulation in the receiver, the carrier wave $f_d+f_a$ again occurs in the video-frequency spectrum of signal I as an auxiliary carrier wave having a frequency $f_h$.

Figure 3:
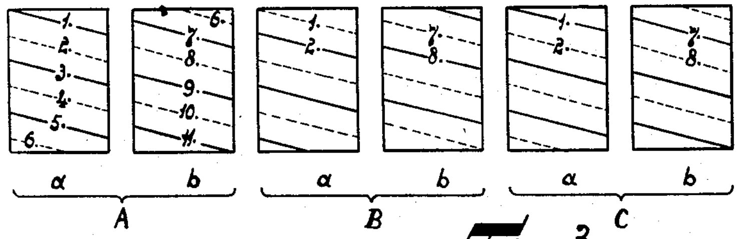
Fig. 3 shows rasters such as occur in the invention.

Since the transmission of the signals II and III alternates at line frequency and a frame consists of an odd number of lines and two interlaced fields, a given line of the frame will contain the initial signal II or III only after two frame periods. Each line of each frame naturally also comprises signal I, this signal being transmitted continuously. It will be evident from Fig. 3, that a given line of the frame will contain the same signal II or III only after two frame periods. In Fig. 3, A, B and C show complete frames each consisting of two fields *a* and *b*. The lines comprising signal II are shown in full lines whereas those containing signal III are shown in interrupted lines. The number of lines of a complete frame is chosen to be 11 for the sake of simplicity. Indeed each line of field *a* of frame A comprises the same signal as the corresponding line of field *a* of frame C. If the frequency of the auxiliary carrier wave, as is usually the case, is an odd multiple of half the line frequency, it is found that the interference caused by the said lines in the image of signal I and, conversely, the interference caused by signal I in the images of signals II and III amplify one another.

If, according to the invention, it is ensured that the phase of the auxiliary carrier wave after every two frame periods has shifted by an odd number times $\pi$ radians, these succeeding interferences are of opposite polarities and thus neutralised. As mentioned before, strictly speaking, such is the case only if images of stationary objects are transmitted. However, if the frame frequency is not unduly low, this approximately also holds good for moving objects and due to the inertia of the eye which accommodates to mean values in time, the influence of the interference is optically not perceptible in practice.

In order to eliminate the above-mentioned interference on one and the same line of the frame, it is necessary and sufficient to control the auxiliary carrier-wave generator at the transmitting end in such manner that the phase of the auxiliary carrier wave has shifted once by $\pi$ radians after every two frame periods. The said phase shift may be caused to occur not only at discrete moments, but also continuously according to the choice of the frequency of the auxiliary carrier wave.

If, for example, the said frequency is equal to an odd multiple of half the line frequency $$\left(\frac{2n+1}{2}\times\text{line frequency}\right)$$

the phase may be caused to shift by $\pi$ radians after every two frame periods. However, if this frequency is equal to half an odd multiple of half the line frequency $$\left(\frac{2n+1}{4}\times\text{line frequency}\right)$$

the phase of the auxiliary carrier wave varies continuously so as to be shifted just once by $\pi$ radians after two frame periods.

By the latter choice of the frequency of the auxiliary carrier wave it is found furthermore that if the number of lines of an image is an 8-fold plus or minus 3 such as in the American system (525 lines), the British system (405 lines) and the French system (819 lines), the interferences on juxtaposed lines comprising the same signal contents such as lines 1 and 7, 2 and 8 of frame A (Fig. 3) are also in phase opposition. This fact is highly beneficial to the quality of the image. However, if the number of lines is an 8-fold plus or minus 1 such as in the European system (625 lines) the phase opposition is ensured by causing the phase of the auxiliary carrier wave to be shifted by $\pm\pi$ radians after each field period. Consequently, in the case of continuous phase displacement, the phase has shifted by 5 or $3\times\pi$ radians after two frame periods.

If the interferences on lines which are juxtaposed in the image and comprise the same signal contents are to be in phase opposition if the frequency of the auxiliary carrier wave is an odd multiple of half the line frequency, this may be ensured for all said numbers of lines by causing their phase shift instead of once after two frame periods, after every three fields out of four fields constituting two frames. This implies that the phase has shifted totally by $3\times\pi$ radians after two frame periods.

Figure 4:
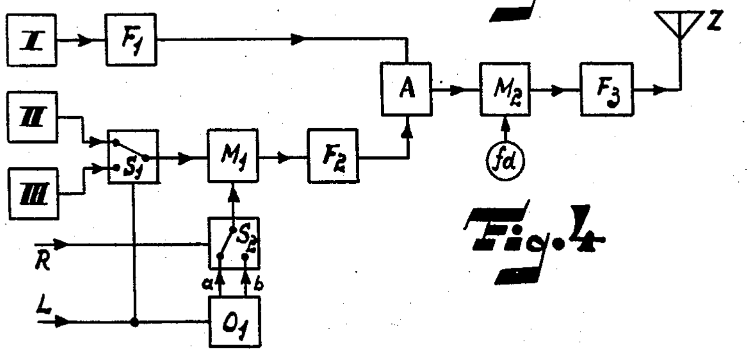
Fig. 4 shows diagrammatically one embodiment of a transmitter for a system according to the invention.

Fig. 4 is a block diagram of a simplified embodiment of a transmitter for a multiplex transmission system according to the invention for the case that the frequency of the auxiliary carrier wave is $$\frac{2n+1}{4}\times\text{the line frequency}$$

and the number of lines is an 8-fold plus or minus 1. The devices I, II and III each comprise a photographing camera producing the signals I, II and III respectively. The signal originating from I is fed to a low-pass filter $F_1$ having a cut-off frequency $f_a$. The output signals from II and III are supplied to a switch $S_1$ by which II and III are alternately connected at line frequency to a modulator $M_1$, the switch $S_1$ for this purpose being controlled by the line-synchronizing pulses entering at L. In the modulator $M_1$ the output signal of II or III is modulated on an auxiliary carrier wave having a frequency $$\frac{2n+1}{4}\times\text{the line frequency}$$

The auxiliary carrier wave is derived from a device $O_1$ which comprises an oscillator suitable for this purpose and which is also controlled by the line-synchronising pulses. The oscillator is of the push-pull type and the output voltage of $O_1$ at point *a* is in phase opposition to the output voltage of $O_1$ at point *b*. A switch $S_2$ connects $M_1$ alternately to *a* or *b*, the alternation being effected after each field. For this purpose the switch $S_2$ is controlled by the field-synchronising pulses entering at R. The output signal of $M_1$ is supplied to a band-pass filter $F_2$ having its transmission range between the frequencies $f_b$ and $f_c$. The output signals of the filters $F_1$ and $F_2$ are combined in an adding device A. The output signal of A may either be transmitted through a line or, after being modulated on a high-frequency carrier wave in the modulator $M_2$ and limited in band-width in a band-pass filter $F_3$, be supplied to a transmitting aerial Z, as shown in Fig. 4.

Figure 5:
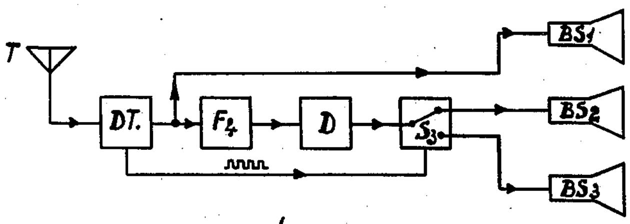
Fig. 5 shows diagrammatically one embodiment of a receiver cooperating with the transmitter shown in Fig. 4, and Figs. 6 and 7 show, also diagrammatically, embodiments of transmitters for a system according to the invention.

Fig. 5 is a block diagram of a simplified embodiment of a receiver adapted for the reception of signals transmitted by the transmitter shown in Fig. 4. The signal received by a receiving aerial T is supplied to a detecting stage DT, at the output of which a signal occurs as shown in Fig. 2. The output signal is supplied on the one hand, to a picture tube $BS_1$ and on the other hand, to a band-pass filter $F_4$ having a transmission range between the frequencies $f_b$ and $f_c$. The output signal of $F_4$ is supplied to a detector D which, together with the band-pass filter $F_4$, constitutes a detector circuit which is tuned to the auxiliary carrier wave and which supplies the signal II or III, modulated on $fh$, plus interference originating from signal I to a switch $S_3$ by which detector D is alternately connected at line frequency to the picture tubes $BS_2$ and $BS_3$. The switch $S_3$ for this purpose is controlled by the line-synchronising pulses originating from DT. The images of the three picture tubes $BS_1$, $BS_2$ and $BS_3$ may finally be combined by optical means. A further possibility is, for example, to supply the output signals of DT and $S_3$ to the control electrodes of a three-colour tube.

Figure 6:
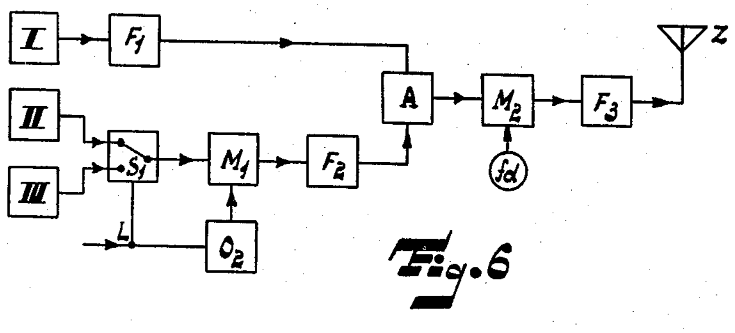

Fig. 6 is a block diagram of a simplified embodiment of a transmitter for a multiplex transmission system according to the invention for the case that the frequency of the auxiliary carrier wave is $$\frac{2n+1}{4}\times\text{the line frequency}$$

and the number of lines is an 8-fold plus or minus 3. The devices I, II, III, $F_1$, $F_2$, $F_3$, $M_1$, $M_2$, $S_1$, and A are similar to the devices indicated correspondingly in Fig. 4. However, the output signal of a device $O_2$ and a single output voltage of frequency $$\frac{2n+1}{4}\times\text{the line frequency}$$

may now be supplied to modulator $M_1$ without any further expedients.

The receiver shown in Fig. 5, naturally apart from modifications in connection with the number of lines, is also suitable for the reception of signals transmitted by the transmitter of Fig. 6.

Figure 7:
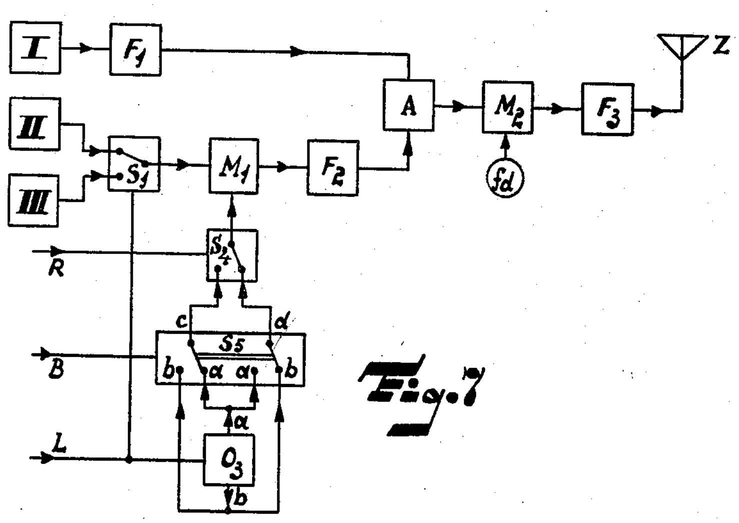

Fig. 7 is a block diagram of a simplified embodiment of a transmitter for a multiplex transmission system according to the invention for the case that the frequency of the auxiliary carrier wave is $$\frac{2n+1}{2}\times \text{the line frequency}$$

As before, the devices I, II, III, $F_1$, $F_2$, $F_3$, $M_1$, $M_2$, $S_1$ and A are analogous to the corresponding devices of Figs. 4 and 6. In the modulator $M_1$ the output signal of II or III is modulated on an auxiliary carrier wave at a frequency $$\frac{2n+1}{2}\times \text{the line frequency}$$

The carrier wave is derived from a device $O_3$ which comprises a suitable oscillator which, in turn, is controlled by the line-synchronising pulses. The oscillator is of the push-pull type, the output voltages of $O_3$ at the points *a* being in phase opposition to the output voltages of $O_3$ at the points *b*. A double switch $S_5$ alternately connects each of the points *c* and *d* to the points *a* or *b*, the alternation being effected at half the frame frequency and hence after every two frame periods. $S_5$ for this purpose is controlled by field- or frame-synchronising pulses entering at B. Consequently, two voltages in phase opposition are invariably applied to the points *c* and *d*. The points *c* and *d* are alternately connected to the modulator $M_1$ by the switch $S_4$, the alternation being affected at raster frequency. $S_4$ for this purpose is controlled by the field-synchronising pulses entering at R. Upon every fourth switching operation of $S_4$, switch $S_5$ also switches with the result that with every fourth switching operation of $S_4$ there is no phase shift of the auxiliary carrier wave supplied to $M_1$. As before, a receiver similar to that of Fig. 5 may serve for reception of the signals transmitted by the transmitter of Fig. 7.

A signal transmitted by transmitters of the kind described with reference to Figs. 4, 6 and 7 may readily be received by an ordinary black-white television receiver, provided of course that the line and frame frequencies, etc. for the transmitter and the receiver are equal. On the picture tube of this receiver a signal will occur similar to that on the picture tube $BS_1$ of the receiver shown in Fig. 5, viz. the signal I plus interference from the two other signals. However, the interference will be neutralized by the said steps and the signal I contains sufficient information to provide a very satisfactory image.

The receiver described with reference to Fig. 5 is adapted for the reception of signals transmitted by an ordinary black-white television receiver. The output signal of the detecting stage DT may here be supplied to, for example, all three picture tubes or, in the case of a three-colour tube, to all three control electrodes of the tube.

What is claimed is:

1. A multiplex transmission system for line-scanned image signals, comprising a source for producing a modulated carrier wave having a given bandwidth, a source of an auxiliary carrier wave, two sources of modulation signals each having a bandwidth less than said given bandwidth, means connected to modulate said auxiliary carrier wave with said modulation signals alternately at the line-scanning frequency of said image signals, said auxiliary carrier wave and the modulations thereon being within the modulated frequency range of said first-named modulated carrier wave, and means connected to shift periodically the phase of said auxiliary carrier wave by an amount substantially equal to $n\pi$ radians where $n$ is an odd number.

2. A multiplex transmission system as claimed in claim 1, in which said last-named means is connected to shift the phase of said auxiliary carrier wave by an odd number times $\pi$ radians after every two frames of said line-scanned image signals.

3. A multiplex transmission system as claimed in claim 1, in which said image is composed of interlaced line-scanned fields in which the frequency of said auxiliary carrier wave is an odd multiple of half of said line-scanning frequency, and in which said last-named means is connected to shift the phase of said auxiliary carrier wave by $\pi$ radians after each three out of four fields.

4. A multiplex transmission system as claimed in claim 1, in which the frequency of said auxiliary carrier wave is $$\frac{2n+1}{4}\text{ times the line-scanning frequency}$$

$n$ being a whole number.

5. A multiplex transmission system as claimed in claim 4, in which said image is composed of interlaced line-scanned fields in which the number of scanned lines in an image is a multiple of 8 plus 1, and in which said last-named means is connected to shift the phase of said auxiliary carrier wave by $\pi$ radians after each field of said line-scanned image signals.

6. A multiplex transmission system as claimed in claim 4, in which said image is composed of interlaced line-scanned fields, in which the number of scanned lines in an image is a multiple of 8 minus 1, and in which said last-named means is connected to shift the phase of said auxiliary carrier wave by $\pi$ radians after each field of said line-scanned image signals.

7. A multiplex transmission system as claimed in claim 1, including a receiver adapted to receive said line-scanned image signals and comprising two image reproducing devices, a switching mechanism, and means for causing said mechanism to feed said two modulation signals to said two image reproducing devices, respectively, alternately at said line-scanning frequency.

References Cited in the file of this patent

UNITED STATES PATENTS

| | | |
|---|---|---|
| 2,333,969 | Alexanderson | Nov. 9, 1943 |
| 2,635,140 | Dome | Apr. 14, 1953 |
| 2,678,348 | Ballard | May 11, 1954 |
| 2,739,181 | Sleeper | Mar. 20, 1956 |

FOREIGN PATENTS

| | | |
|---|---|---|
| 709,245 | Great Britain | May 19, 1954 |

OTHER REFERENCES

Principles of NTSC Compatible Color Television Electronics, pages 88–96, February 1952.